(12) United States Patent
Coutant et al.

(10) Patent No.: US 6,460,681 B1
(45) Date of Patent: *Oct. 8, 2002

(54) SYSTEM FOR SORTING ARTICLES USING A DOUBLE CARRYING TRAY

(75) Inventors: Ralph Coutant, Ridgewood; Alfred W. Iversen, Upper Montclair, both of NJ (US)

(73) Assignee: W & H Systems, Carlstadt, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/585,011

(22) Filed: Jun. 1, 2000

Related U.S. Application Data

(63) Continuation-in-part of application No. 09/444,860, filed on Nov. 22, 1999, now abandoned, which is a continuation of application No. 08/794,861, filed on Feb. 5, 1997, now Pat. No. 5,990,437.

(51) Int. Cl.$^7$ .............................................. B65G 47/40
(52) U.S. Cl. ............................ 198/370.04; 198/370.03; 209/583; 209/912
(58) Field of Search ....................... 198/370.04, 370.03, 198/704, 349.95; 209/583, 577, 584, 587, 559, 576, 912, 900

(56) References Cited

U.S. PATENT DOCUMENTS

| | | | | |
|---|---|---|---|---|
| 3,848,728 A | * | 11/1974 | Leibrick et al. | 198/155 |
| 4,993,535 A | * | 2/1991 | Scata | 198/365 |
| 5,054,601 A | * | 10/1991 | Sjogren et al. | 198/365 |
| 5,181,597 A | | 1/1993 | Geerts | |
| 5,388,681 A | * | 2/1995 | Bonnet | 198/365 |
| 5,590,995 A | * | 1/1997 | Berkers et al. | 414/357 |
| 5,690,209 A | * | 11/1997 | Kofoed | 198/370.06 |
| 5,746,301 A | | 5/1998 | Maier | |
| 5,967,290 A | * | 10/1999 | Bonnet | 198/370.04 |
| 5,990,437 A | * | 11/1999 | Coutant et al. | 209/583 |

* cited by examiner

Primary Examiner—Donald P. Walsh
Assistant Examiner—Joseph Rodriguez
(74) Attorney, Agent, or Firm—Lowenstein Sandler PC

(57) ABSTRACT

A system for sorting articles, the system having a track which defines a route starting at least one loading point, the route continuing on to a plurality of destination points and arriving back at the loading point. The system also has at least one tray for conveying an article from the loading point to a selected one of the destination points. The tray comprises a first and a second half pivotally coupled to each other. The track includes a first segment for momentarily tilting a leading end of the tray upward relative to a trailing end of the tray and possibly downward again, and a second segment for laterally tilting the first half and the second half of the tray at an angle. The first and second segments selectively maneuver an article loaded in the tray to a bottom corner thereof prior to the tray reaching the selected destination point in order to substantially reduce the jarring of the article during the discharge thereof at the selected destination point. A scanner is provided for scanning an identification-code disposed on the article. The scanner is coupled to a controller which determines the selected destination point using the information obtained by the scanner from the identification-code disposed on the article.

42 Claims, 13 Drawing Sheets

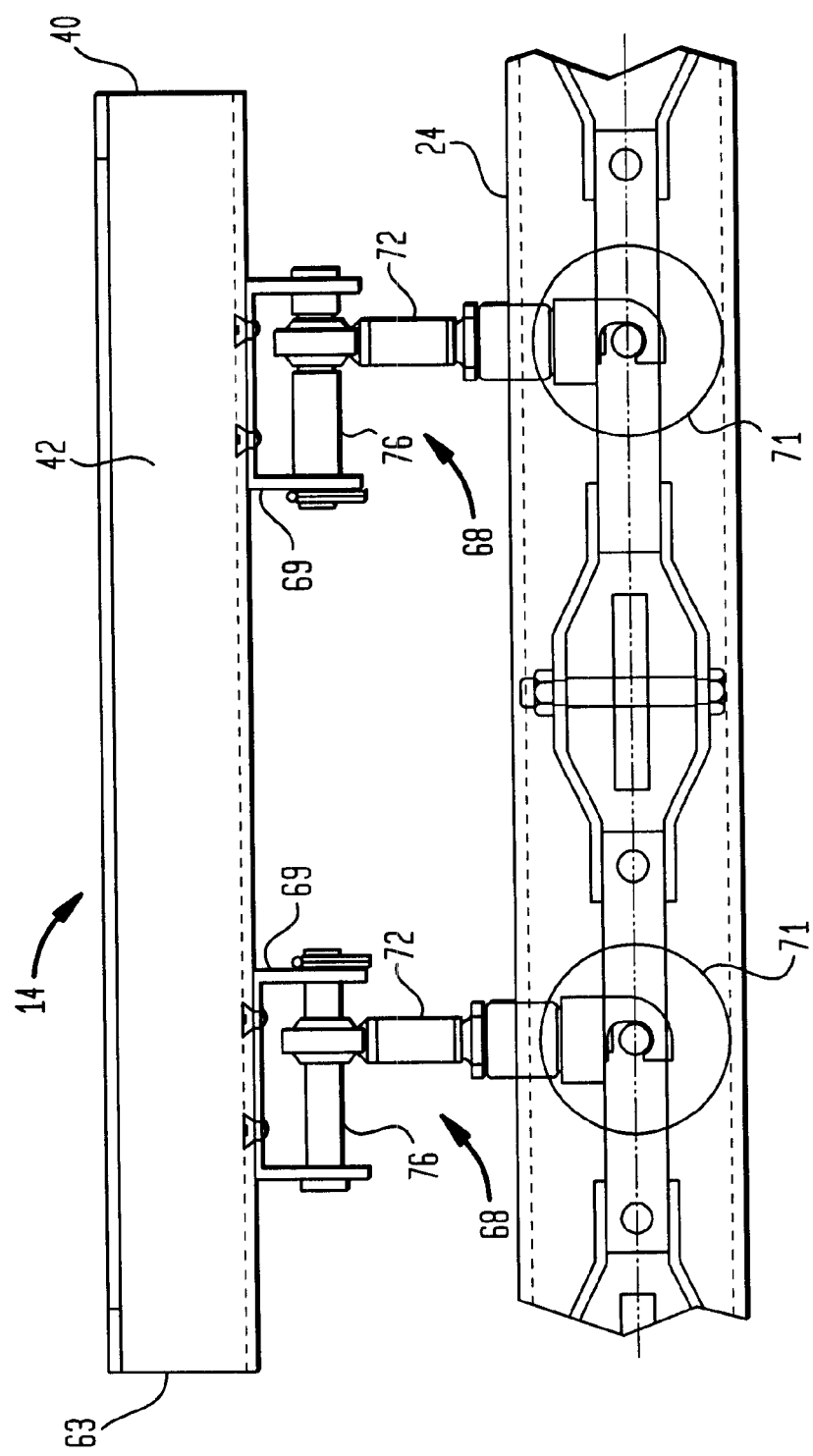

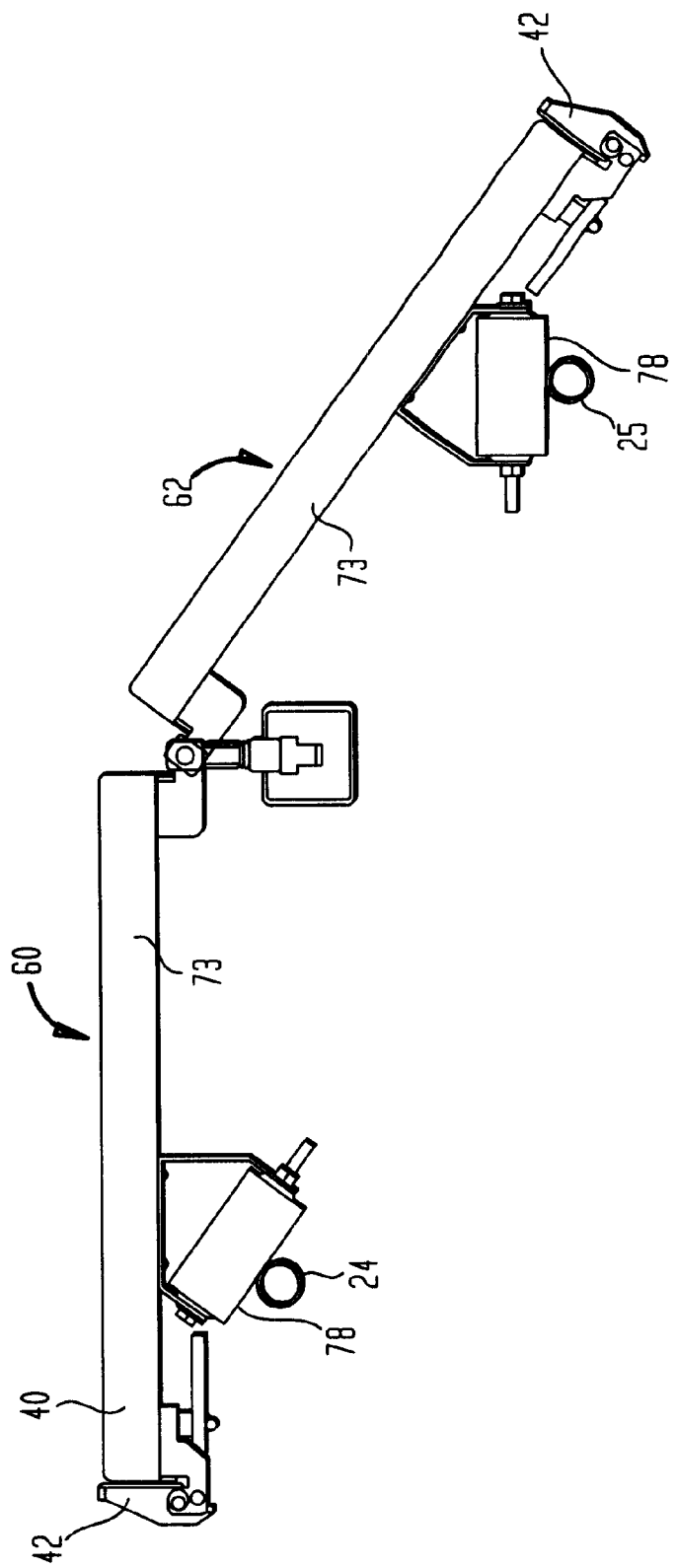

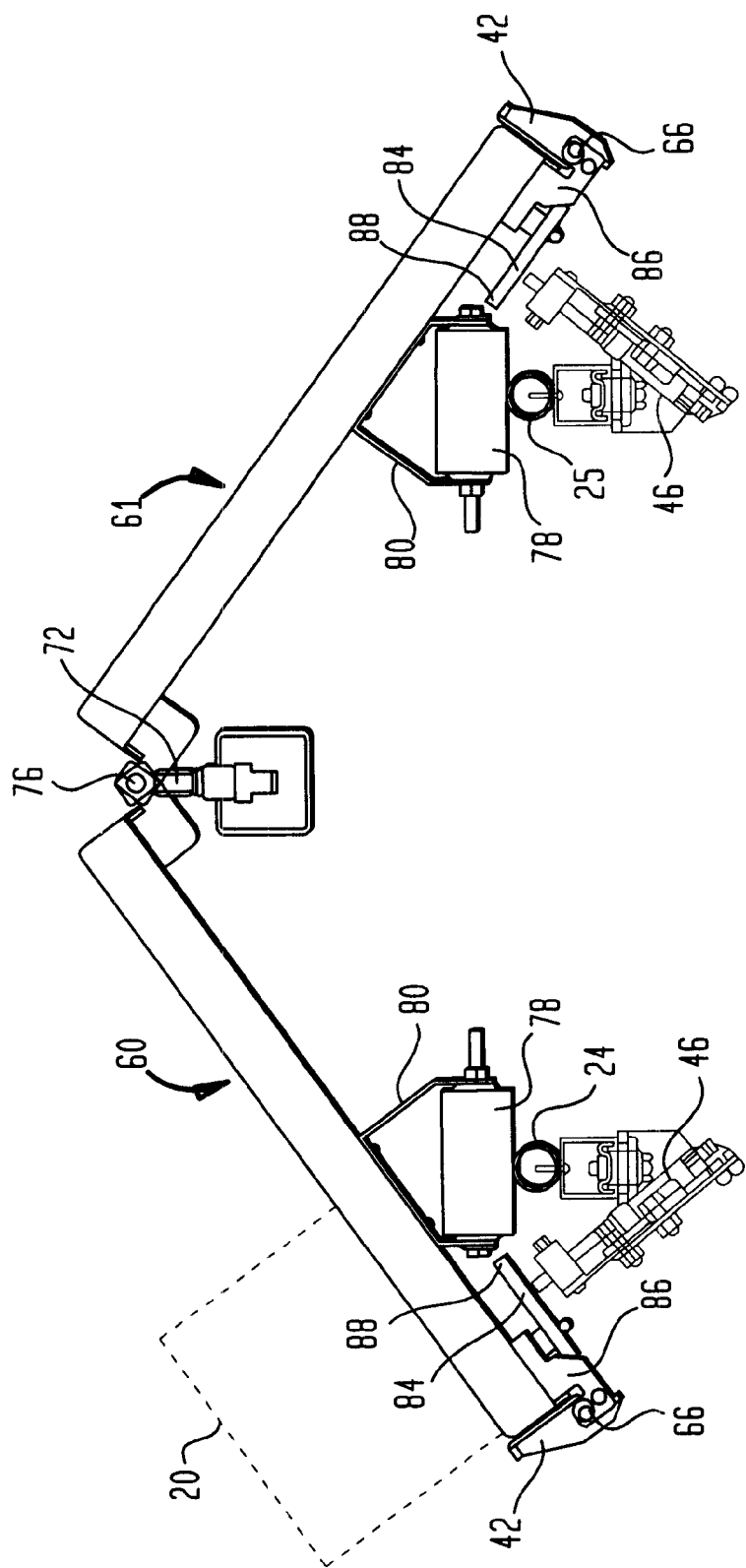

US 6,460,681 B1

SYSTEM FOR SORTING ARTICLES USING A DOUBLE CARRYING TRAY

RELATED APPLICATIONS

This application is a Continuation-in-part of Application Serial No. 09/444,860 filed Nov. 22, 1999 now abandoned which is a continuation of Application Serial No. 08/794,861 filed Feb. 5, 1997, issued on Nov. 23, 1999 as U.S. Pat. No. 5,990,437.

FIELD OF THE INVENTION

The present invention relates to sorting and conveying systems. More specifically, the present invention relates to an inexpensive article sortation system which utilizes double carrying trays that are tilted from a horizontal position to an angled position prior to the discharge of articles carried by the trays.

BACKGROUND OF THE INVENTION

Various article sortation systems have been employed in the merchandising and processing of articles and parcels. Such systems require rapid and reliable transportation of the articles from a loading station to one of any number of unloading stations or destinations. These systems are commonly used in airport terminals to sort baggage, in post offices to sort mail, and in warehouses to sort delivered articles to selected storage areas in the warehouses. Article sortation systems must be capable of handling a wide variety of articles which are placed on trays for conveying and sorting. Present day article sortation systems operate at speeds which enable them to transport articles adequately. As the speeds of the carrying trays increase to allow for the sorting of greater quantities of articles, difficulties have surfaced in discharging the articles from the carrying trays at the article destination points or sortation lanes. Some of these difficulties involve the articles being thrown or tumbled from the trays during discharging, which can cause damage to the article. Another difficulty involves the accuracy of article discharge which results in articles being improperly sorted and the like.

The prior art has made many attempts to solve these difficulties by providing conveyor systems which unload carried articles by some type of tray tilting operation. For example, U.S. Pat. No. 4,461,378 to Roth discloses a power driven conveyer assembly which has a supporting framework that defines a conveyor pathway. A conveyor belt follows the pathway and has a top surface which is adapted for carrying articles. The belt is then tilted to one side of the pathway to discharge the carried articles. Another example can be seen in U.S. Pat. No. 3,360,106 to Harrison et al. which discloses a continuous conveyor system having a carriage mechanism with individual trays mounted thereon. Each tray is supported on the carriage by a linkage assembly that can tilt the tray in either direction. Many other article sortation systems employing article discharge by tray tilting are described in the prior art.

A major disadvantage of these prior art article sortation systems lies in their mechanical complexity which results in high capital costs and high maintenance costs. Further, the mechanical complexity of prior art sortation systems may result in less than desirable reliability. Moreover, the gentleness and accuracy with which articles are discharged in some prior art sortation systems leaves much to be desired.

Therefore, a need exists for a simpler and less expensive article sortation system which is capable of sorting a wide variety of articles in an accurate and gentle manner.

SUMMARY OF THE INVENTION

In accordance with the present invention, there is provided a system for sorting articles. The system comprises a track which defines a route starting at at least one loading point. The route defined by the track continues on to a plurality of destination points and arrives back at the loading point. The system also comprises at least one double carrying tray for conveying articles from the loading point to selected ones of the destination points. The double carrying tray comprises a first half pivotally coupled to a second half. The track assembly allows for the momentary tilting of a leading end of the tray upward relative to a trailing end of the tray and possibly downward again, and for the lateral tilting of the first half and second half of the tray at opposing angles. The track assembly selectively maneuvers articles loaded in the first half and second half of the tray to a bottom corner thereof prior to the tray reaching the selected destination point in order to substantially reduce the jarring of the articles during the discharge thereof at the selected destination points.

DESCRIPTION OF THE DRAWINGS

A more complete understanding of the present invention may be obtained from consideration of the following description in conjunction with the drawings in which:

FIG. 3C is a side elevational view of the double carrying tray of FIGS. 3A and 3B;

FIG. 4 depicts an alternative embodiment of the track assembly;

FIG. 5 depicts a diverter engaging the latch lever of the double carrying tray.

DETAILED DESCRIPTION OF VARIOUS ILLUSTRATIVE EMBODIMENTS

Figure 1A:
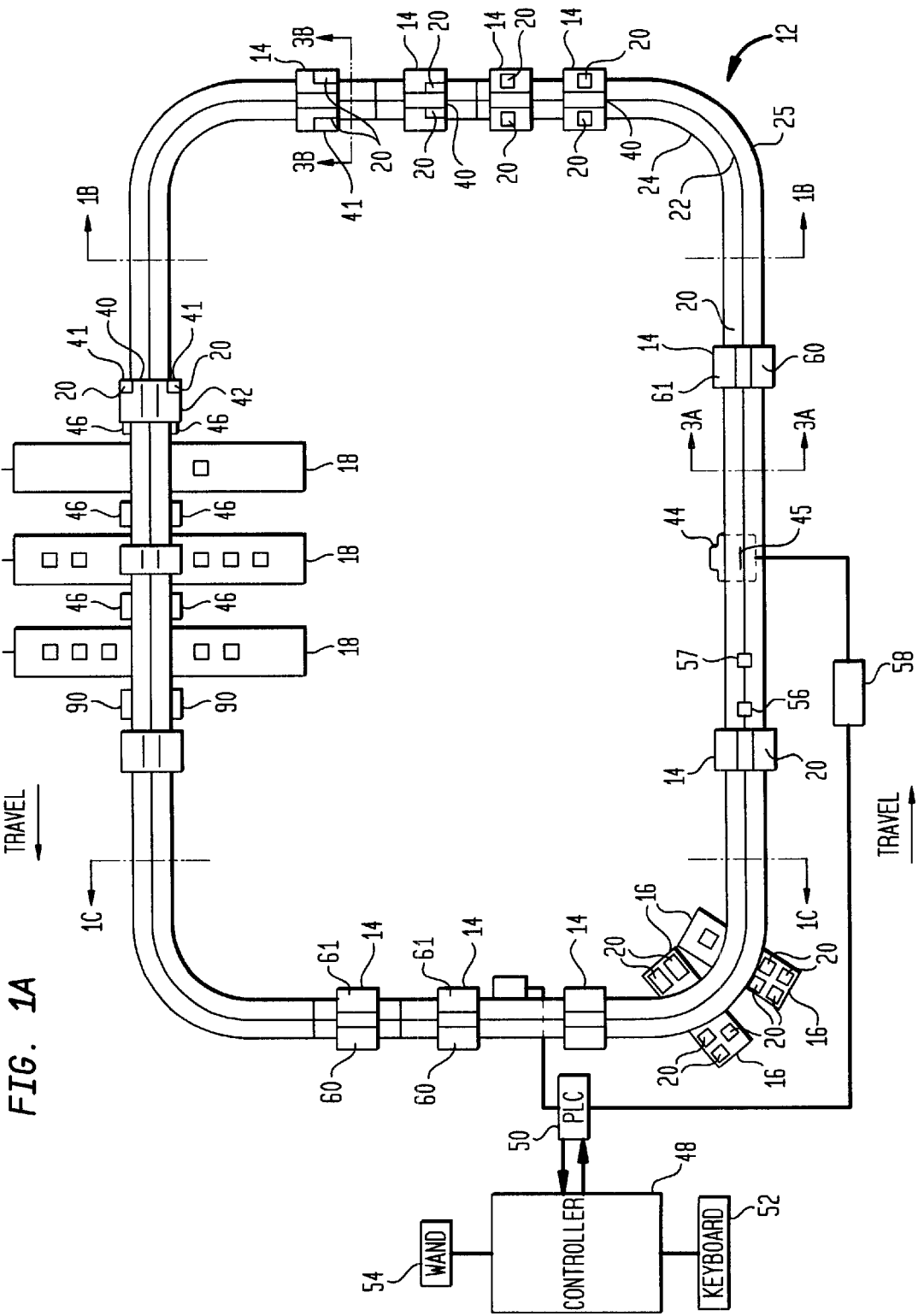
FIG. 1A is a top plan view of an exemplary embodiment of the track assembly of the article sortation system of the present invention.
Figure 1B:
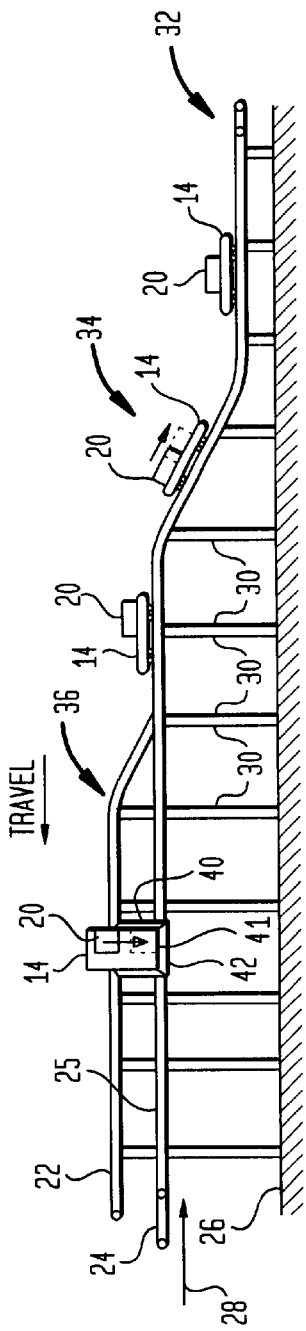
FIG. 1B is a side elevational view of the track assembly taken through line 1B—1B of FIG. 1A.

Referring to FIGS. 1A and 1B, an embodiment of the article sortation system 10 of the present invention is shown. The sortation system 10 basically consists of a plurality of double carrying trays 14 which are continuously transported along a track assembly 12 at a relatively constant speed. Each double carrying tray 14 comprises a first half 60 and a second half 61. The configuration of the double carrying tray 14 is described in more detail below. The track assembly 12 defines a continuous pathway or route that originates at one or more article loading stations 16, continues on through a plurality of sortation lanes 18 or article destination points, and returns to the article loading stations 16. The loading stations 16 can be located on one or both sides of the track assembly 12 and store articles 20 which have been delivered thereto in bulk and need to be sorted. The double carrying trays 14 can be loaded from either or both sides of the track assembly 12 and the double carrying trays 14 are capable of discharging the articles 20 from both sides of the track assembly 12 simultaneously or one side at a time. The articles 20 which are discharged at the various sortation lanes 18 are subsequently loaded onto trucks or transported to other areas in the building where the system 10 is operating.

The article sortation system 10 of the present invention, is especially intended for sorting small to medium sized articles such as cartons, bags, books, apparel and the like. For example, the system 10 can sort articles which are relatively small dimensionally, such as cosmetics, and articles which are relatively large dimensionally, such as, cases of packaged articles, for example, books. The weight of such articles can typically range between only a few ounces and 30 pounds. Moreover, as will be explained, because of special features incorporated into the double carrying trays 14, the system is also capable of handling round, rounded or irregularly shaped articles.

Figure 1C:
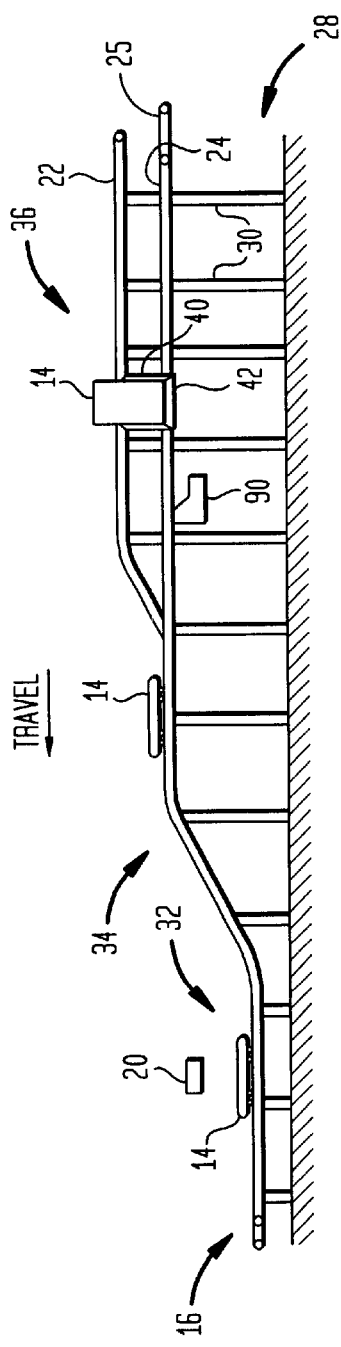
FIG. 1C is a side elevational view of the track assembly taken through line 1C—1C of FIG. 1A.

The track assembly 12 includes a drive track 22 and tray support rails 24 and 25, each of which are elevated above the ground or floor 26 at various heights along the route by a supporting framework 28 as shown in FIGS. 1B and 1C. As would be understood, the drive track 22 may be channel-shaped or be of another conventional design so as to include or support a drive chain other conveying mechanism. The supporting framework 28 is made up of a plurality of vertical stand supports 30. The length of each support 30 varies depending upon the desired elevation of each track at any given point along the route. The track assembly 12 is supported by the framework 28 at first, second, and third elevational orientations 32, 34, and 36. The first elevational orientation 32 is provided along the route at the article loading stations 16 as shown in FIG. 1B. In the first elevational orientation 32, the framework 28 supports the drive track 22 and the tray support rails 24 and 25 at the same vertical height to maintain the double carrying trays 14 in a horizontal position for article loading. The second elevational orientation 34 is provided some distance downstream from the article loading stations 16. In the second elevational orientation 34 the framework 28 sharply increases the elevation of both the drive track 22 and the tray support rails 24 and 25 over a short linear span in order to momentarily tilt the leading end of the trays 14 upward thereby gently shifting transported articles toward the trailing end of the tray, preferably against the tray's trailing sidewall 40. Moving slightly further down the route track assembly 12 is configured in the third elevational orientation 36, where the framework 28 increases the elevation of the drive track 22 only, while maintaining the elevation of the tray support rail 24 and 25. The third elevational orientation 36 laterally tilts the first half 60 and second half 61 of the trays 14 at opposing angles prior to reaching selected sortation lane 18. The lateral tilting of each half 60 and 61 of the double carrying tray 14 gently shifts the transported article 20 toward and preferably against a discharge door of the tray 14 for discharge on both tray support rail 24 and 25 sides of the track assembly 12. With the articles 20 now positioned in a bottom corner 41 of the first half and second half tray 14, each article 20 can now be discharged from its respective half 60 and 61 of the tray 14 at a selected sortation lane or destination point with substantially less jarring and with greater accuracy than if the article 20 is discharged from the original point of loading as in prior art tilting tray designs. As would be understood, the angle of inclination for the first half and the second half of the tray while in the third elevational orientation will be sufficient to facilitate article movement out of the tray when the discharge door to the tray is opened. Although the present invention is described as including a drive track and tray support rails, it would be understood to a person skilled in the art that other types of drive and support arrangements, including alternate drive mechanisms and tracks, having comparable functionality may also be utilized.

Figure 1D:
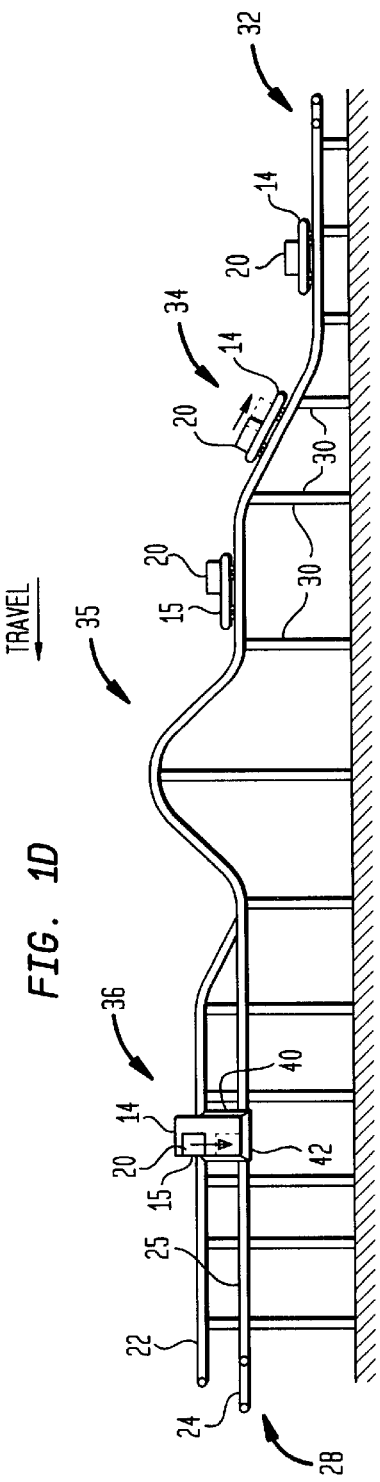
FIG. 1D is a side elevational view for an alternate embodiment of the track assembly.

Referring to FIG. 1D, an alternate embodiment of the present invention sortation system is shown where like reference numerals refer to like system components as described in previous figures. As shown in FIG. 1D, the sortation system includes a fourth elevational orientation 35 located between the second elevational orientation 34 and the third elevational orientation 36. The fourth elevational orientation 35 provides a sharp decrease in elevation of the drive track and the tray support rails, for example, prior to reaching the third elevational orientation 36. The decrease in elevation provided by the fourth elevational orientation 35 momentarily tilts the leading end 15 of the trays 14 downward relative the trailing end of the trays. This produces a shift of the transported article toward the leading end of the tray, preferably against the tray's leading sidewall. In this way, the lateral tilting of the tray which takes place at elevational orientation 36 will now gently shift the transported article 20 toward and preferably against the discharge door of the tray 14 at the leading end 15 of the tray 14.

With the article now positioned in the leading bottom corner of the tray 14, the article can now be discharged from the tray at a selected sortation lane or destination point utilizing the gravitational forces which act upon the article while the tray is in a laterally inclined orientation. It will be noted that the positioning of the article 20 at the leading bottom corner of the tray 14 is advantageous in that the article can be more accurately diverted from the tray. This is the case as positioning of the article at the leading bottom edge of the tray substantially prevents rotation of the article as it leaves the tray since the article 20 will avoid contact, for example, with any of the tray edges (which could produce a rotation or other type of article deflection) as the article is discharged. Also, although FIG. 1D shows elevational orientation 35 as including both an elevational increase and decrease or hump-like feature, it would be understood that a single elevational increase (for the leading end of the tray) may be incorporated at elevational orientation 34, wherein the fourth elevational orientation would include only an elevational decrease. It would also be understood that flexibility exists for selecting the actual location for elevational orientations 34 and 35 along the system route, as long as these orientations are implemented between elevational orientations 34 and 36. It may, however, be preferable for elevational orientation 35 to be located proximate elevational orientation 36 such that positioning of the article will remain intact.

In other embodiments of the invention, the third elevational orientation 36 can be achieved by decreasing the elevation of the drive track 22 relative to the tray support rails 24 and 25 or by decreasing the elevation of the tray support rails 24 and 25 relative to the drive track 22. In addition, the sortation lanes 18 do not have to be located at the same position on opposite sides of the track assembly 12. For example, FIG. 4, shows embodiment where the double carrying tray 14 in position to discharge of an article 20 from the second half 61 of the tray 14 only. At this position in this particular embodiment, the track support rails are not at the same elevation, but rather track support rail 24 is at elevation 36 and track support rail 25 is at elevation 34. At this position along the track assembly 12, there is only a sortation lane on the track support rail 25 side of the assembly 12. As shown in FIG. 1C, once a double carrying tray 14 discharges its articles 20, the double carrying tray 14 continues further along the route to an area of the track assembly 12 configured in the second elevational orientation 34 which places the tray 14 back into the horizontal position. Moving further along, the double carrying tray 14 returns to the first elevational orientation 32 of the track assembly 12 and the loading stations 16.

Referring again to FIG. 1A, the track assembly 12 also includes a variable speed electric motor 44 for powering a drive chain or other conveying means (not shown) which runs through the drive track 22 to drive and brake the double carrying trays 14 which are attached to the drive chain. In a preferred embodiment of the invention the drive track may move the double carrying trays at speeds ranging between 5 ft./min. to 160 ft./min. A control diverter 46 is located along the drive track 22, in areas of the track 12 assembly that come just before a sortation lane 18 in the travel direction of the trays 14. The sortation lanes 18 are located on both sides on the track assembly 12 as shown in FIG. 1A. Each control diverter 46 is used to selectively trigger a latch mechanism of the first half and second half of the tray 14 when the tray 14 reaches a selected sortation lane 18, to open the discharge door 42 of the tray 14 to allow the article 20 carried therein to gently slide from the tray 14 into a chute or a shipping carton at the selected sortation lane 18 or destination point after discharge of the article. The discharge door 42 is automatically closed by means of one of the cam blocks 90. As can be seen in FIG. 1C, each cam block 90 is generally wedge-shaped such that the discharge door contacts the block at an angled portion thereof. As the movement of the tray continues toward the cam block, the angled portion of the block gradually closes the discharge door of the tray.

A programmable logic controller 50 (PLC) is used for routing the articles 20 to their desired sortation lanes 18. The PLC 50 uses the speed of the drive chain, the identity of the carried article 20, and the location of the trays 14 at predetermined points along the track assembly 12 to route the articles 20 to their desired sortation lanes 18. The programmable logic controller 50 (PLC) is also provided as an interface between a microprocessor based main controller 48, for example a personal computer, and the motor 44, the diverters 46 and various other pieces of peripheral hardware which are used to identify and route the carried articles 20. PLCs are general purpose combinational or sequential digital components whose ultimate function is determined by the designer. The PLC of the present invention essentially functions as a plurality of programmable "switches" which can be programmed, erased and reprogrammed to implement the functions of the various peripheral hardware items which are connected to the PLC. The timing and selection of these switches are determined by the controller 48.

In another embodiment of the invention, a PC is used as the controlling method. The PC has all of the capabilities of the PLC, but runs on a PC platform. It should be understood that the PLC 50 can be a conventional PLC or a PLC-type logic running on a PC.

The various other pieces of hardware mentioned above include means for identifying the article 20 so that the controller 48, for example a PC, can determine to which sortation lane 18 the article 20 is to be diverted. The article identification means can take the form of an operator keyboard 52 for manual entry of article information and/or a hand-held, wand-style identification-code scanner 54, and/or an identification-code scanner 56 permanently attached to the track assembly 12 for automatic entry of article 20 information. An article sensor 57 is also included at a fixed location along the track assembly 12 for the purpose of determining whether a tray 14 in the sortation system is loaded with an article 20. The article sensor 57 may be an identification-code reader system, a vision-type sensor, or a photosensor. The identification-code reader is mounted along the track assembly, typically overhead, and detects the presence of an article on a tray by reading a valid identification code disposes on an article. If no identification code is read and an article is not detected on a tray, the doors of that tray are opened at a specified article sortation lane to handle all products with an unreadable identification code. The vision-type sensor detects the presence using a sensor such as a video camera typically mounted overhead to sense whether an article is present on a tray. The sensor returns a True or False answer to the system for each tray depending on whether an article is present.

The fixed location scanner and/or article sensor provides a defined reference point for the specific location of a tray or article within the system. An encoder 58 associated with the drive motor 44, monitors the speed of the motor 44 in pulses/RPM (revolutions/minute), for example, and converts that signal into a digital signal which represents a linear dimension. This digital signal is transmitted to the PLC to enable the PLC 50 to determine the location of each tray 14 on the track assembly 12 based upon a previously determined reference location. The exact discharge instructions and location for a specific tray can then be realized, for example, by decrementing a counter corresponding to the specific tray as the trays pass by the article sensor. Since, in a preferred embodiment, there are set number of equally spaced trays included in the system, a specific count of encoder pulses which corresponds to a specific tray will indicate a discharge location as would be understood by a person skilled in the art.

Figure 2:
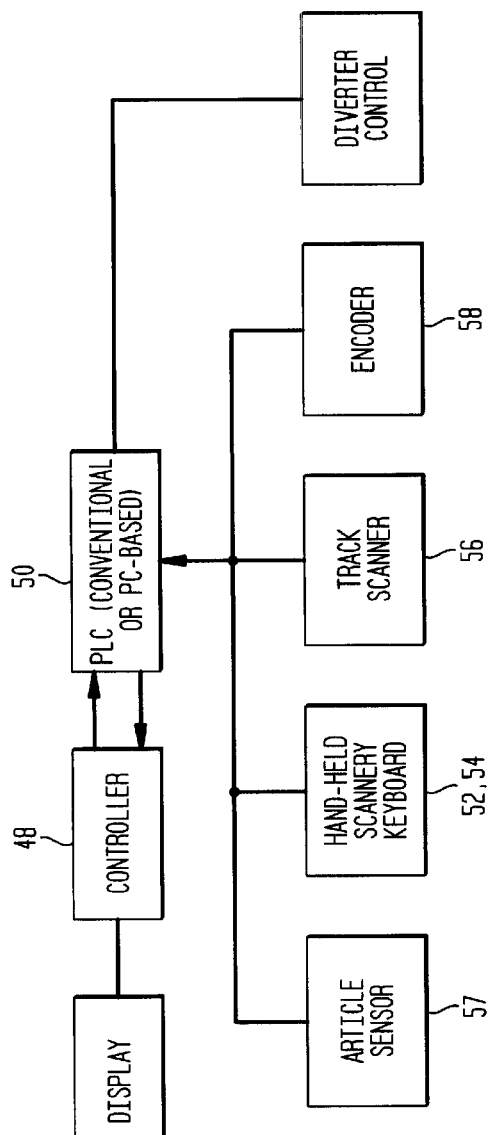
FIG. 2 is flowchart depicting the message architecture used in the article sortation system of the present invention.

The block diagram of FIG. 2, depicts the message flow for the system architecture used in the present invention. The information generated by the keyboard/identification-code scanners 52, 54, 56 are transmitted to the main controller 48 via the PLC 50. As discussed, the controller 48 is programmed to use this information to determine to which sortation lane 18 an article 20 is to be diverted. The PLC 50 activates the appropriate control diverter 46 associated with the selected sortation lane 18 at an appropriate interval based on location of a tray. The controller also includes software which enables an operator to change a store assignment for any sortation lane 18 at any time. Such changes take effect when the next article is scanned. The software also allows the controller 48 to provide current and historical information for each article identification-code that was processed, sortation statistics and activity logging that can be viewed on an on-line screen.

The controller software also provides a security system that controls access to the system 10 using security profiles. The security system is configured so that all users have full access to each area of the system 10. As would be understood, the security system also enables administrators to limit user access to specific system functions.

The administrator of the system 10 assigns each user an ID which allows them access to the system 10. A user ID can be unique to an individual or can be used to represent a group of users. Each user ID has an associated password thus preventing unauthorized use of the ID.

Each user ID is attached to a security profile. The administrator of the system 10 creates various security profiles which define the functionality of the system 10 that can be accessed. This allows multiple users to be given the same security clearance simply by assigning their user IDs to the same profile.

The security system also maintains an audit trail that tracks what parts of the system each user ID has accessed and when it was accessed. Accordingly, this feature enables individuals to be accountable for their actions.

The security system provides three security screens, a Log In screen which allows a user to access the security system; a User Maintenance screen which allows authorized users to add or delete a user ID as well as change security information associated with it; and a Profile Maintenance screen which allows authorized users to add or delete security profiles or to restrict or grant permission of system functions to a specified profile.

The controller software also provides a number of system screen layouts. The first of these screens is a main menu screen which allows an operator to select any of the available other screens for setting parameters, monitoring and changing certain parameter values in the PLC. From the main menu screen, the operator can choose any option from the menu bar or any submenu that is not currently unavailable or grayed out. The operator may reset the sorter counts and statistics by selecting a "Reset PLC Statistics" option under "System." This action will reset all the product counts, reads, etc. for each lane in the Sortation system.

Figure 6:
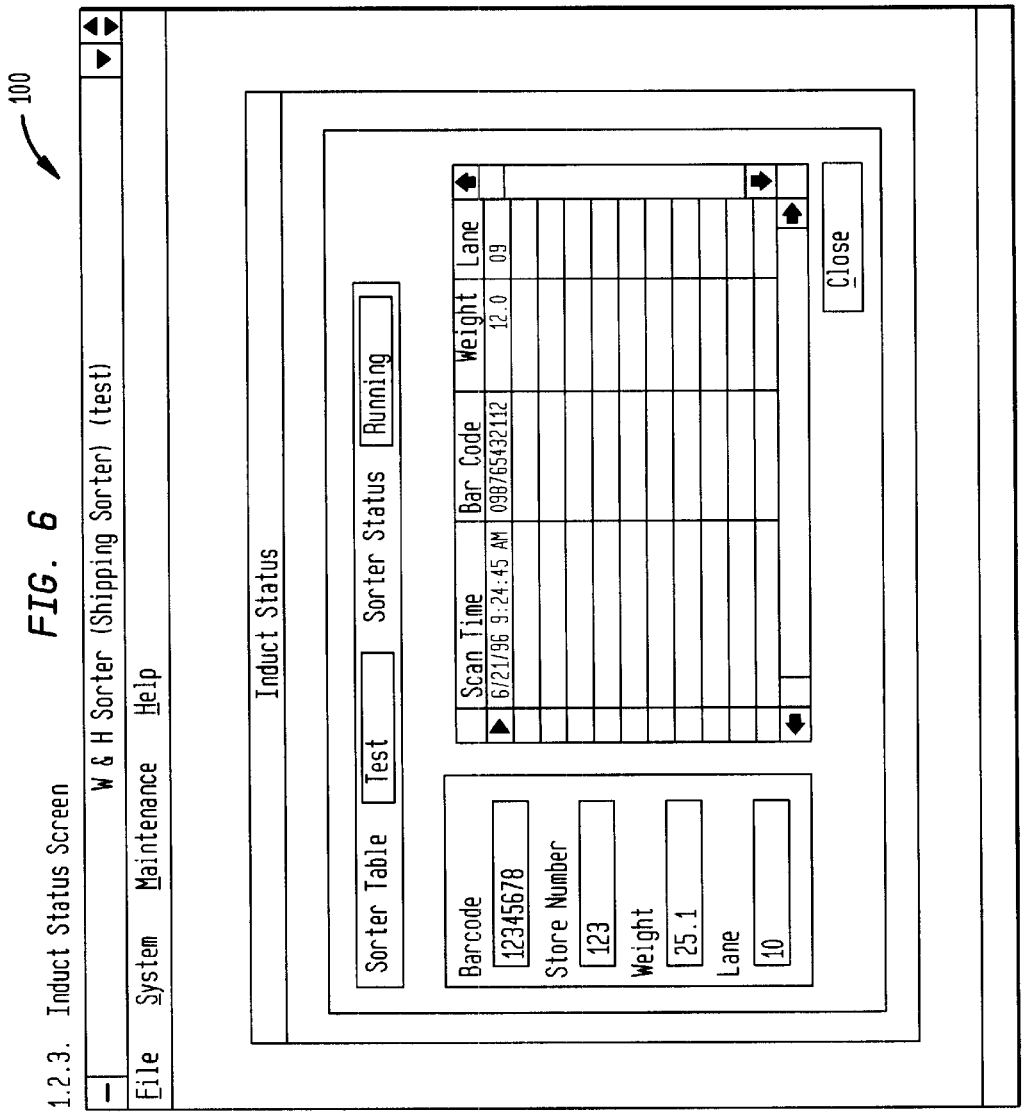
FIGS. 6, 7, and 8 depict exemplary embodiments of display screens generated in connection with software modules found in a controller of the present invention.

Referring to FIG. 6, an exemplary embodiment of an induct status screen 100 is shown for displaying induct activity as it occurs at the sortation scanner. In the shown illustration, for example, as an identification code is scanned, a field's bar-code and lane number are updated. These fields display the scanned identification code of the article 20 and the lane number for which the article 20 is destined, based on a current sorter table. A listing of the last 100 identification codes scanned can be maintained to provide a history of articles scanned.

A lane statistics screen is also provided for summarizing the status of each sortation lane. This includes the lane number, the number of articles diverted, the number of full line occurrences, the total duration of full line condition and the number of jams.

A sorter error log screen is provided for displaying sorter errors in reverse chronological order. This screen includes a date and time stamp of the error and the error message.

The sorter article history is provided on a sorter article history screen which displays identification codes, scanned time, article handle and sortation lane assigned in chronological order for all articles that have been scanned and not purged.

Figure 7:
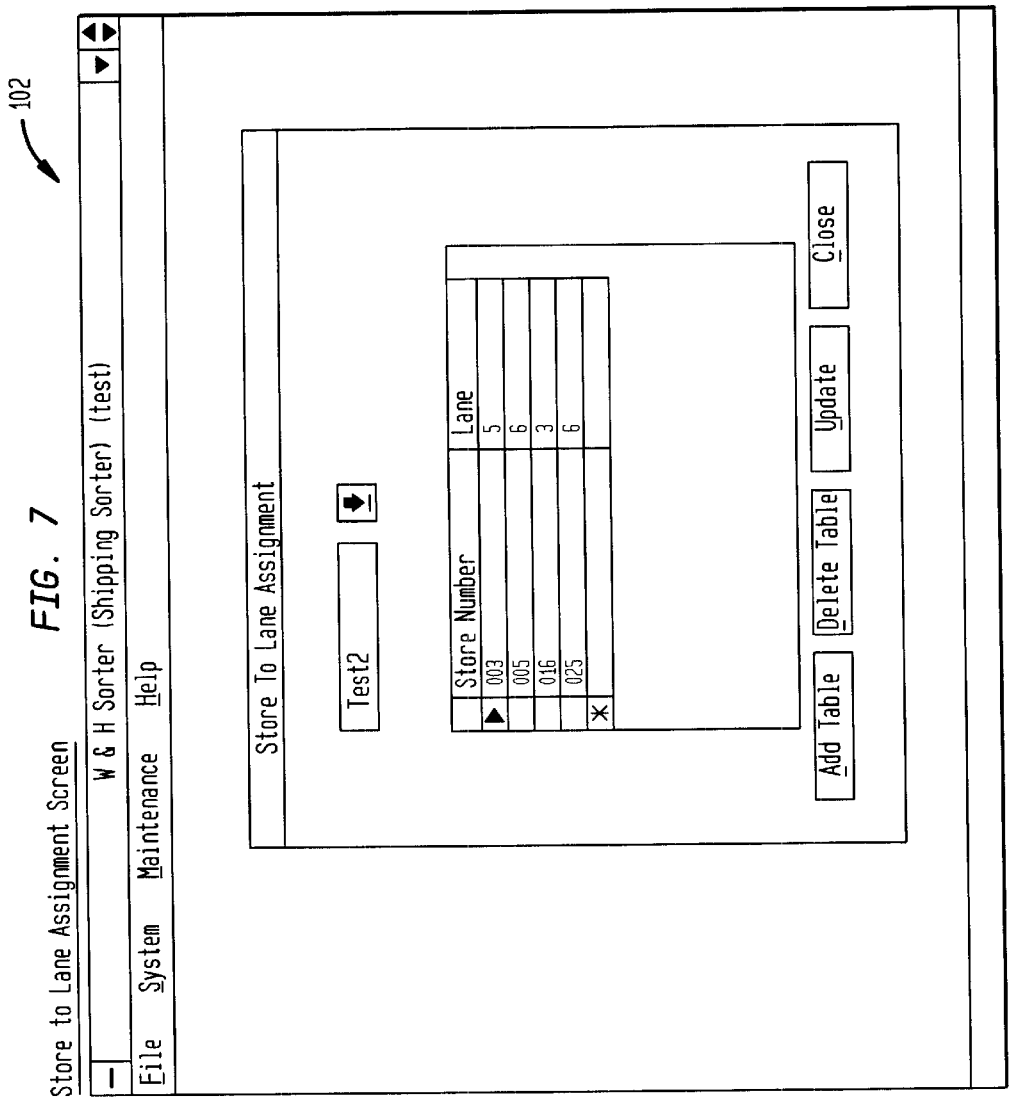

A sortation parameters screen 102 is shown in FIG. 7 and is provided for allowing operators to configure various system parameters. An operator can set the number of consecutive times a condition occurs that causes the system 10 to shut down. An operator can also set purge frequencies for the error log and article history along with the system date and time.

Tables that will associate a store number on the article 20 identification code to the lane to which the product should be diverted can be created and maintained with a store to sortation lane assignment screen which is provided.

Figure 8:
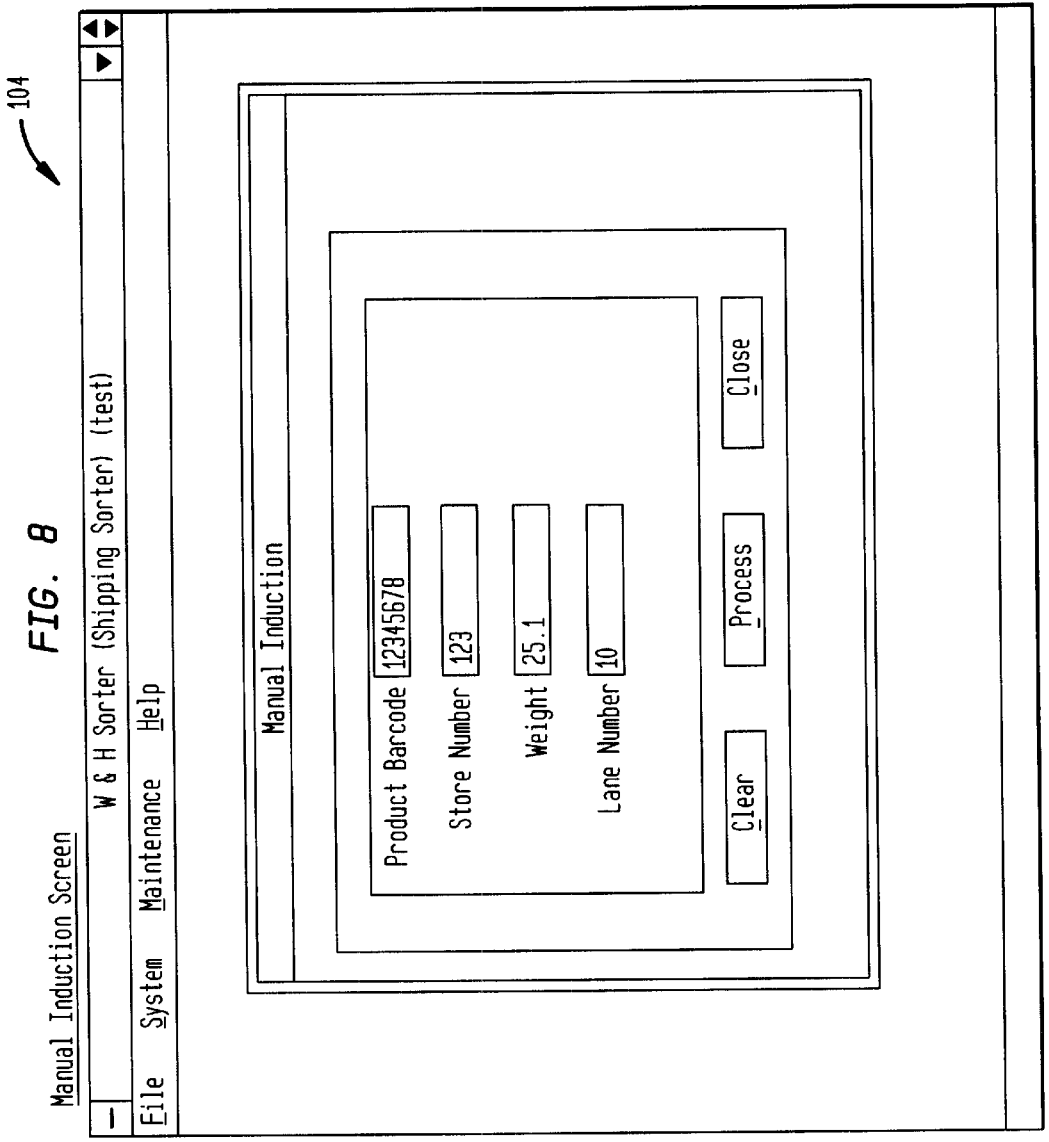

An additional screen, shown in FIG. 8 is a manual induction screen 104 which is used to enter articles manually, such as non-conveyables and articles that are not readable at the identification code scanners. Based on the exemplary illustrations and descriptions of the various screens included in the software of the controller, it is anticipated that a person skilled in the art could realize suitable implementations of the screens which have been discussed.

Referring collectively now to FIGS. 3A–3D, each double carrying tray 14 comprises a first half 60 and a second half 61 wherein both the first half and second half comprise the same elements and are mirror images of each other. Each half 60 and 61 comprises a base 62 with a leading sidewall 63 and the earlier described trailing sidewall 40. The base 62 of each half of the double carrying tray 14 may include a plurality of apertures 64 to assist the article sensor 57 to easily determine that a non-loaded tray is empty and in the alternative to view the presence of an article and/or identification code of an article 20 loaded in the tray 14. It is understood that the described aperture feature is not critical to the utility of the invention and may not be included in a particular embodiment thereof.

Figure 3A:
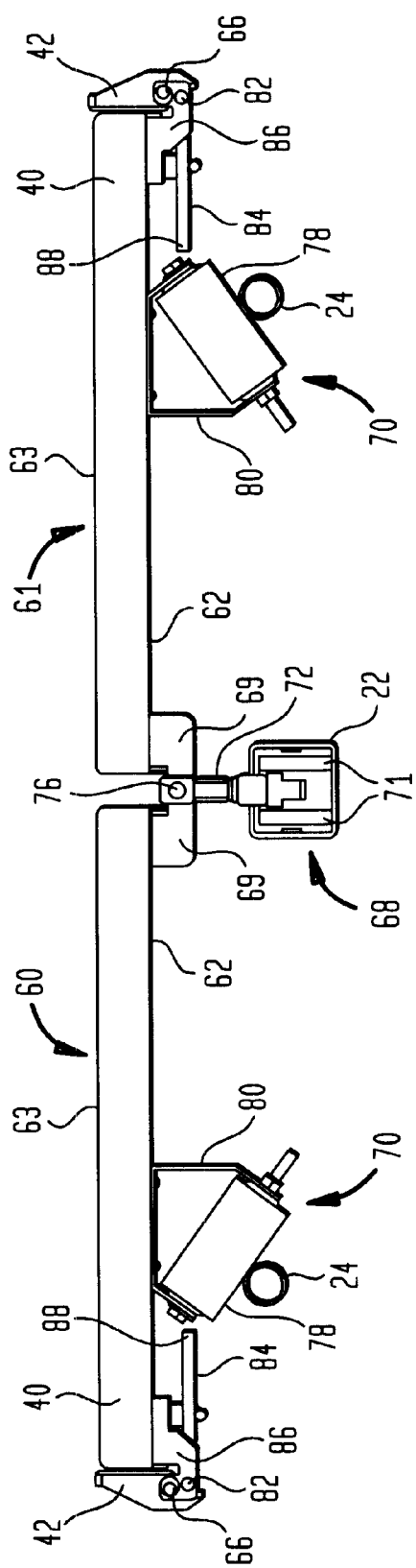
FIG. 3A is a cross-sectional view of the track assembly taken through line 3A—3A of FIG. 1A and depicts an exemplary embodiment of a double carrying tray in a horizontal position.
Figure 3B:
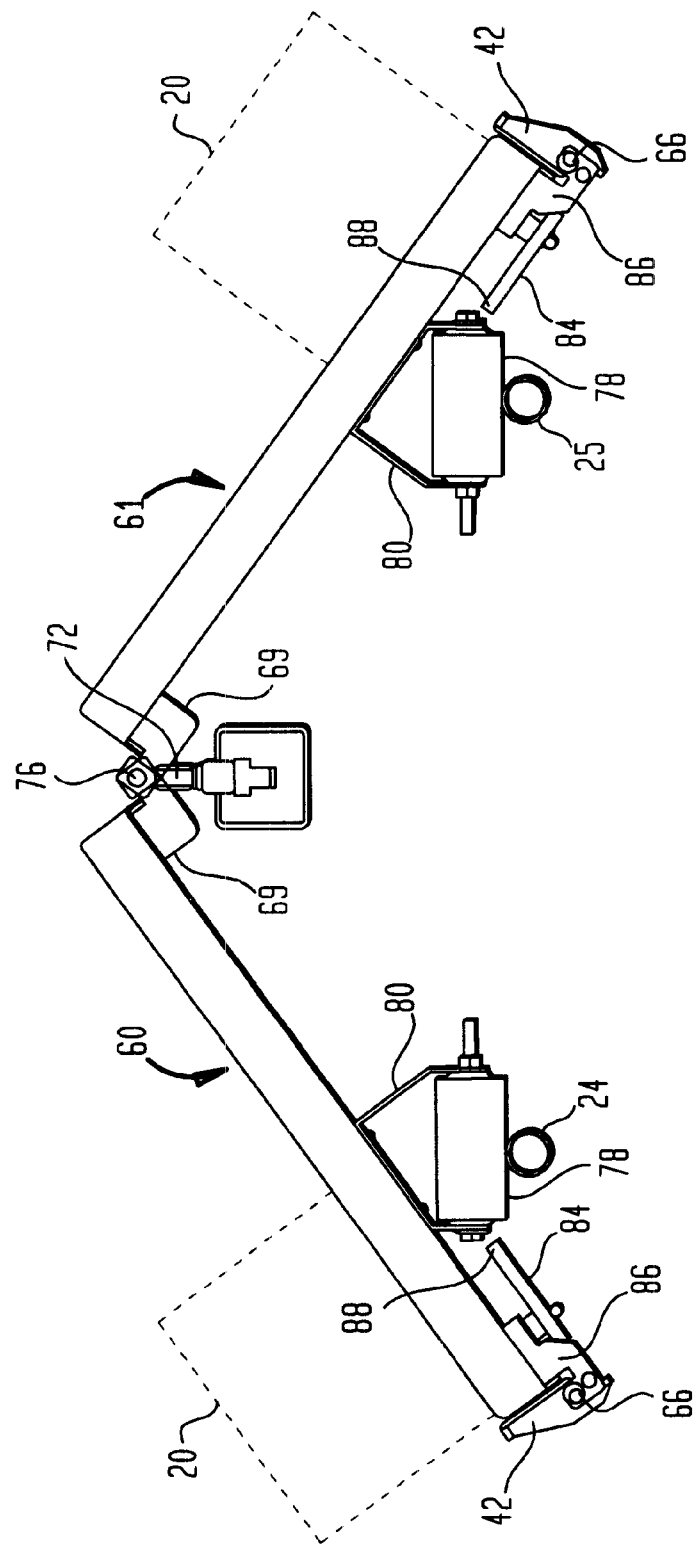
FIG. 3B is a cross-sectional view of the track assembly taken through line 3B—3B of FIG. 1A and depicts the double carrying tray of FIG. 3A in a laterally tilted position.
Figure 3D:
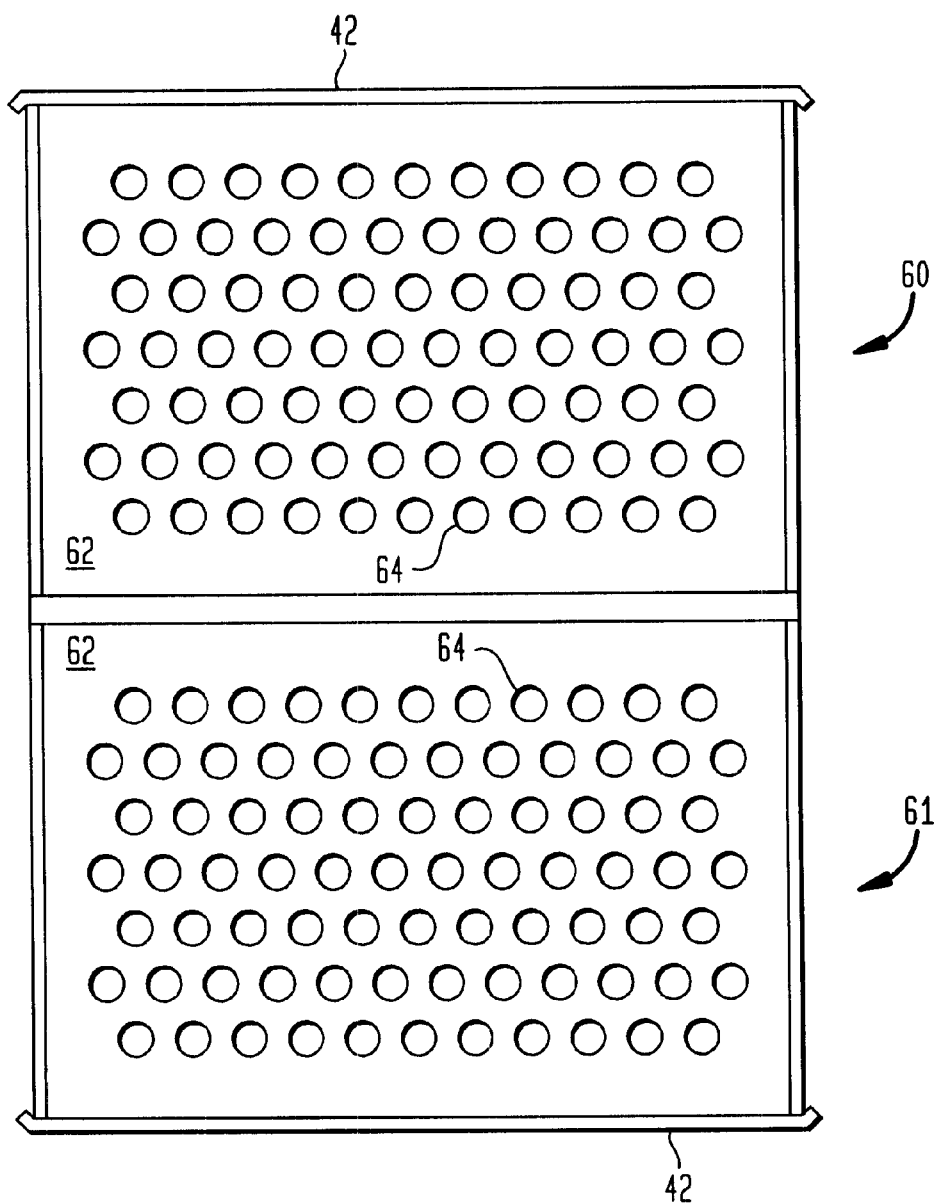
FIG. 3D is a top plan view of the double carrying tray of FIGS. 3A–3C.
Figure 3E:
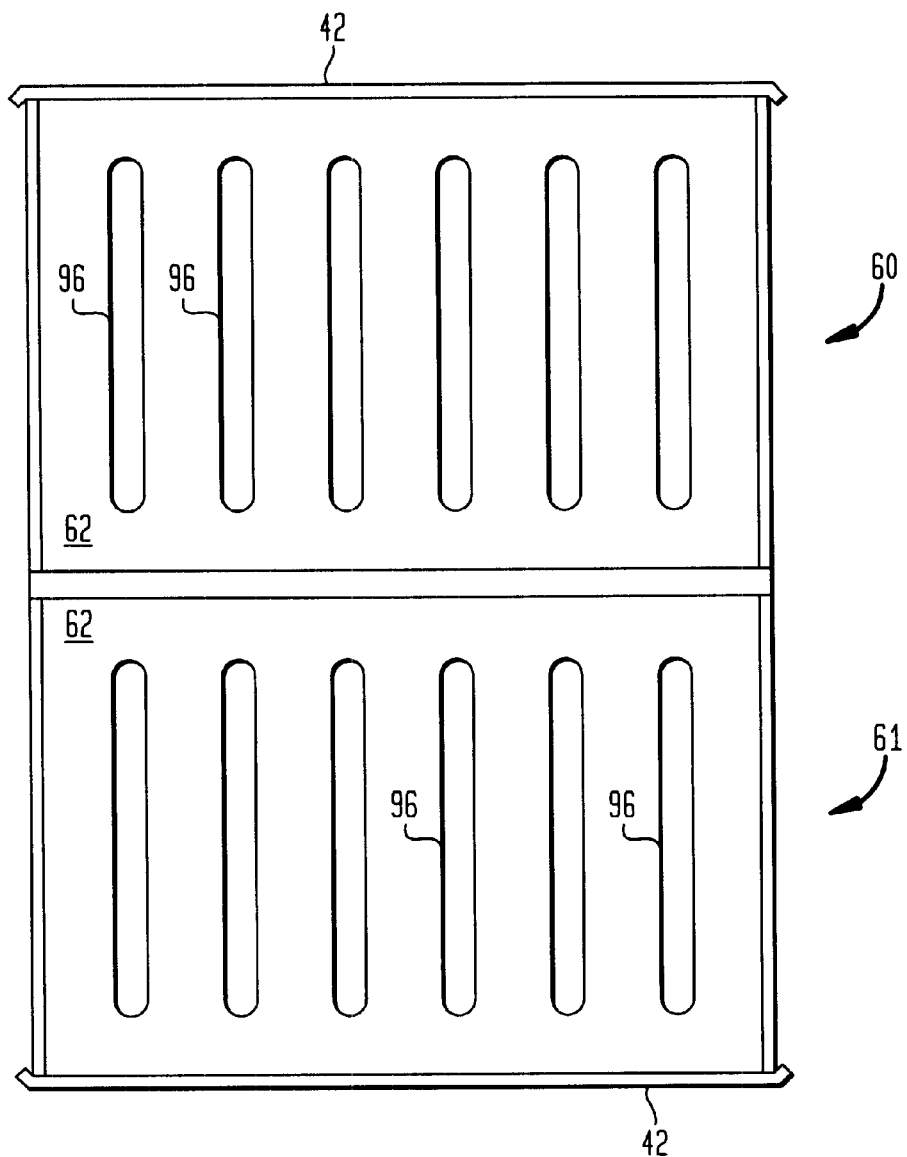
FIG. 3E is a top plan view of an alternate embodiment of the double carrying tray.

As shown in FIG. 3E, an alternate embodiment of the double carrying tray may also include raised rib features 96 in the base 60 thereof so as to accommodate the handling of, for example, round objects. In this case, the round objects are stabilized in between the rib features and are prevented from substantial movement within the tray. It would be understood, that any suitable pattern of rib features may be used within the double carrying trays and that this aperture feature may or may not be included in a particular embodiment of the invention.

The double carrying trays 14 are generally sized to accommodate the largest article 20 to be sorted. In one embodiment, the double carrying tray 14 is approximately 1 to 3 feet in length and approximately 3 feet in width. The discharge door 42 described earlier, extends between the leading sidewall 63 and the trailing sidewall 40, and is attached to the base 62 by a hinge arrangement 66 including a spring-loaded discharge lever 84. Each double carrying tray 14 also includes two attachment assemblies 68 and two roller assemblies 70. Each attachment assembly 68 is pivotally attached to an inner edge of both the first 60 and second 61 halves of the double carrier tray 14 via a bracket 69. The roller assemblies 70 are attached to the base 62 of the first 60 and second halves 61 of the carrier tray 14 respectively. The attachment assemblies 68 which travel in the channel-shaped drive track 22, each comprise a pair of wheels 71 coupled to a rod end 72. The rod end 72 allows the double carrying trays 14 to negotiate curves in the track assembly 12 by allowing the attachment assemblies 68 to pivot and turn about the vertical axis along the track assembly 12. The rod end 72 of each roller assembly 68 is coupled to a rod 76 which engages bracket 69 of both the first half 60 and the second half 61 of the double carrying tray 14. The rod 76 enables each of the halves 60 and 61 to pivot downward or laterally tilt about the rod with respect to the attachment assembly 68. The lateral tilting of the halves 60 and 61 is shown in FIG. 1B and occurs when the drive track 22 elevates to elevation 36 while the track support rails 24 and 25 remain at elevation 34. The rod end 72 of each roller assembly 68, is coupled to the bracket 69 via the rod 76 to provide fore and aft movement of the first half 60 and second half 61 relative to the rod end 72. This arrangement facilitates the travel of the double carrying trays 14 over the inclined and ascending portions of the track assembly 12. The rod end 72 of each drive track 22 roller assembly 68 is also coupled to the drive chain which travels in the drive track 22 to drive and brake the double carrying trays 14.

The roller assemblies 70, which are arranged to travel on the tray support rails 24 and 25; each comprise a cylindrical-shaped wheel 78 which is coupled to a slightly skewed bracket 80 affixed to the base 62. The configuration of the bracket.80 provides the wheel 78 with a positive camber angle which prevents lateral rocking of the double carrying trays 14 when they travel in the horizontal orientation at elevation 32 and briefly at elevation 34. When the change in relative elevation between the drive track 22 and the tray support rails 24 and 25 causes the first half 60 and the second half 61 to be tilted toward the unloading position, the bracket 80 provides the wheel 78 with a slight negative camber angle which laterally stabilizes the double carrying trays 14 as they travel in the tilted orientation.

As briefly described above, each half 60 and 61 of the double carrying tray 14 is provided with a latch mechanism 82 which locks and unlocks the discharge door 42. The latch mechanism 82 includes a pivotally mounted spring-loaded lever 84 having a latch end 86 and a free end 88. The latch end 86 of the lever 84 cooperates with a slot arrangement (not shown) on the discharge door 42 to lock the discharge door 42 in the closed position. When the lever 84 is pivoted, the latch end 86 of the lever 84 disengages the slot arrangement to unlock the door 42. Such latch arrangements are well known in the art.

As shown in FIG. 5, the control diverter 46 is a well known solenoid actuator. When one of the control diverters 46 located along the track assembly 12 is selectively energized a portion of the diverter 46 engages the free end 88 of the double carrying tray's 14 latch lever 84 and causes the lever 84 to pivot as shown. The pivotal movement of the lever 84 unlocks the discharge door 42 upon whose hinge 66 the door 42 immediately opens due to the forces of gravity. Soon after discharging the article 20 from the double carrying tray 14, the still tilted carrying tray 14 passes a wedge-shaped cam block 90 located on the discharge door side of the track assembly 12, which engages the opened discharge door 42 and closes it. As the discharge door closes, the latch end 86 of the spring-loaded lever 84 engages the slot arrangement of the latch of the door 42 to lock the door 42 closed.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A system for sorting articles, comprising:
   a track defining a route starting at at least one loading point and continuing onto a plurality of destination points;
   at least one tray for conveying articles from said at least one loading point to selected ones of said destination points, said at least one tray having a leading end and a trailing end and a first half and a second half, said first half being pivotally coupled to said second half;
   wherein said track includes first means for momentarily tilting said leading end of said at least one tray upward relative to said trailing end of said at least one tray, and second means for laterally tilting said first half at an angle and said second half at an opposite angle.

2. The system for sorting articles according to claim 1 wherein said first and second means selectively maneuver articles loaded in said first half and said second half to a bottom corner thereof prior to at least one tray reaching said selected ones of said destination points in order to substantially reduce the jarring of the articles during the discharge thereof at said selected ones of said destination points.

3. The system for sorting articles according to claim 1, further comprising third means for momentarily tilting said leading end of said at least one tray downward relative said trailing end of said at least one tray to maneuver said articles toward said leading edge of said tray, said third means located between said first means and said second means.

4. The system for sorting articles according to claim 1, further comprising tray driving means for driving said at least one tray along said track.

5. The system for sorting articles according to claim 1, wherein said first half and said second half of said at least one tray includes means for enabling articles to be selectively discharged from said first half and said second half of said at least one tray when said at least one tray reaches said selected ones of said destination points.

6. The system for sorting articles according to claim 1, further comprising diverter means for causing the articles to be discharged from said first half and said second half of said at least one tray at said selected ones of said destination points.

7. The system for sorting articles according to claim 6, further comprising controller means coupled to said diverter means for selectively activating said diverter means.

8. The system for sorting articles according to claim 1, further comprising controller means for determining said selected one of said destination points using information relating to the location of said at least one tray on said track and the articles loaded thereon.

9. The system for sorting articles according to claim 8, further comprising:
   tray driving means for driving said at least one tray along said track,
   speed measuring means coupled between said controller means and said tray driving means, for monitoring the speed of said tray driving means, said controller means using the speed of said tray driving means and a sensed reference location of said tray to determine the location of said at least one tray on said track.

10. The system for sorting articles according to claim 8, further comprising scanning means coupled to said controller means, for scanning an identification-code disposed on the articles loaded on said first half and said second half of said at least one tray and an article sensor for sensing presence of the articles on said first half and said second half of said at least one tray.

11. The system for sorting articles according to claim 10, further comprising diverter means coupled to said controller means and associated with said destination points of said track, for causing articles to be discharged from said first half and said second half of said at least one tray at said selected one of said destination points, said controller activating said diverter means in response to information received from said speed measuring means and said scanning means.

12. The system for sorting articles according to claim 10, wherein said article sensor comprises an identification-code reader associated with said track such that said at least one tray passes under said identification-code reader as said at least one tray moves along said track and said identification-code reader reads the identification-code disposed on the articles to determine whether said at least one tray includes said articles.

13. The system for sorting articles according to claim 10, wherein said article sensor comprises a vision-type sensor associated with said track such that said at least one tray passes under said vision-type sensor as said at least one tray moves along said track and said vision-type sensor determines whether said at least one tray includes said articles.

14. The system for sorting articles according to claim 10, wherein said article sensor comprises a photosensor associated with said track such that said at least one tray passes over said photosensor as said at least one tray moves along said track, said at least one tray including a base with a plurality of apertures which enables said photosensor to scan through said base and determine whether said at least one tray includes said articles.

15. The system for sorting articles according to claim 1, wherein said first half and said second half of said at least one tray includes raised rib sections in a base portion thereof to provide stabilization in said tray for specific article types.

16. The system for sorting articles according to claim 15, wherein said specific article types include round objects.

17. The system for sorting articles of claim 1 wherein:
said track comprises a drive track for moving said tray and a plurality of support rails for supporting said tray, and
said second means for laterally tilting said first and second tray halves comprises a change in relative elevation between the drive track and the tray support rails.

18. The system of claim 17 wherein each said tray half includes a roller for rolling on one of the support rails.

19. The system of claim 18 wherein each said roller comprises a cylindrical wheel affixed to the tray with a positive camber angle to reduce lateral rocking of the tray as it travels along the track.

20. The system of claim 19 wherein each said roller comprises a cylindrical wheel affixed to the tray with a positive camber angle to reduce lateral rocking of the tray as it travels along the track.

21. A system for sorting articles, comprising:
a track defining a route starting at at least one loading point and continuing on to a plurality of destination points;
at least one tray for conveying articles from said at least one loading point to a selected one of said destination points, said at least one tray having a leading end and a trailing end and a first half and a second half, said first half being pivotally coupled to said second half;
wherein said track includes at least a first segment for orienting said at least one tray in a horizontal position in order that said at least one tray can be loaded with articles at said at least one loading point, at least a second segment for momentarily tilting said leading end of said at least one tray upward relative to said trailing end of said at least one tray, and at least a third segment for laterally tilting said first half at a first angle from said horizontal position and for laterally tilting said second half at a second angle from said horizontal position, wherein said first angle and said second angle are opposite angles.

22. The system for sorting articles according to claim 21 wherein said second and third segments of said track selectively maneuver articles loaded in said first half and said second half of said at least one tray to a bottom corner thereof prior to said at least one tray reaching said selected one of said destination points in order to substantially reduce the jarring of the articles during the discharge thereof at said selected one of said destination points.

23. The system for sorting articles according to claim 21, further comprising a fourth segment for momentarily tilting said leading end of said at least one tray downward relative to said trailing end of said at least one tray to maneuver said articles toward said leading edge of said tray prior to reaching said third segment, said fourth segment coupled between said second segment and said third segment.

24. The system for sorting articles according to claim 21, further comprising:
a drive chain coupled to said at least one tray for pulling said at least one tray along said track; and
an electric motor for driving said drive chain.

25. The system for sorting articles according to claim 21, wherein said first half and said second half each includes a discharge door and latch means for opening said discharge door to discharge articles when said at least one tray reaches said selected one of said destination points.

26. The system for sorting articles according to claim 25, further comprising a diverter associated with each of said destination points, one of said diverters being operative for activating said latch means to discharge articles from said at least one tray at said selected one of said destination points.

27. The system for sorting articles according to claim 26, further comprising controller means coupled to said diverters for selectively activating said one of said diverters.

28. The system for sorting articles according to claim 21, further comprising controller means for determining said selected one of said destination points using information pertaining to the location of said at least one tray on said track and the articles loaded thereon.

29. The system for sorting articles according to claim 28, further comprising:
a motor; and
an encoder coupled to said controller means and said motor for monitoring the speed of said motor in revolutions/minute and converting the speed into a digital signal representing a linear dimension, said controller means using said digital signal representing said linear dimension and a sensed reference location of said tray to determine the location of said at least one tray on said track.

30. The system for sorting articles according to claim 28, further comprising a scanning means coupled to said controller means, for scanning an identification code disposed on articles loaded on said at least one tray and an article sensor for sensing presence of the articles on said at least one tray.

31. The system for sorting articles according to claim 30, further comprising a plurality of diverters coupled to said controller means, each one of said diverters associated with one of said destination points, one of said diverters being operative for causing articles to be discharged from said first half and said second half of said at least one tray at said selected ones of said destination points, said controller selectively activating one of said diverters in response to information received from said encoder and said scanning means.

32. The system for sorting articles according to claim 30, wherein said article sensor comprises an identification-code reader associated with said track such that said at least one tray passes under said identification-code reader as said at least one tray moves along said track and said identification-code reader reads the identification-code disposed on the articles to determine whether said at least one tray includes said articles.

33. The system for sorting articles according to claim 30, wherein said article sensor comprises a vision-type sensor associated with said track such that said at least one tray passes under said vision-type sensor as said at least one tray moves along said track and said vision-type sensor determines whether said at least one tray includes said articles.

34. The system for sorting articles according to claim 30, wherein said article sensor comprises a photosensor associated with said track such that said at least one tray passes over said photosensor as said at least one tray moves along said track, said at least one tray including a base with a plurality of apertures which enables said photosensor to scan through said base and determine whether said at least one tray includes said articles.

35. The system for sorting articles according to claim 30, wherein said controller means provides an operator of said system with a plurality of graphical user interface screens.

36. The system for sorting articles according to claim 21, wherein said first half and said second half of said at least one tray each includes raised rib sections in a base portion thereof to provide stabilization for articles loaded in said tray.

37. The system for sorting articles of claim 21 wherein:
said track comprises a drive track for moving said tray and a plurality of support rails for supporting said tray, and
said second means for laterally tilting said first and second tray halves comprises a change in relative elevation between the drive track and the tray support rails.

38. The system of claim 37 wherein each said tray half includes a roller for rolling on one of the support rails.

39. A system for sorting articles, comprising:
a track defining a route starting at at least one loading point and continuing on to a plurality of destination points;
at least one tray for conveying articles having an identification code disposed thereon, from said at least one loading point to a selected one of said destination points, said at least one traying having a first half and a second half pivotally coupled;
an article sensor for determining whether said articles is disposed within said at least one tray;
scanning means for scanning the identification-code disposed on the articles loaded in said at least one tray; and
controller means for determining said selected one of said destination points using the identification-code disposed on the articles, wherein said track momentarily tilts a leading end of said at least one tray upward relative to a trailing end of said at least one tray, and laterally tilts said first half at an angle and said second half at an opposite angle.

40. The system for sorting articles according to claim 39 wherein said track selectively maneuvers articles loaded in said first half and said second half to a bottom corner thereof prior to said at least one tray reaching said selected one of said destination points in order to substantially reduce the jarring of the articles during the discharge thereof at said selected one of said destination points.

41. The system for sorting articles according to claim 39, further comprising:
a motor; and
an encoder coupled to said controller means and said motor for monitoring the speed of said motor in revolutions/minute and converting the speed into a digital signal representing a linear dimension, said controller means using said digital signal representing said linear dimension to determine the location of said at least one tray on said track.

42. The system for sorting articles according to claim 39, wherein said track momentarily tilts said leading end of said at least one tray downward relative said trailing end of said at least one tray to maneuver said articles toward said leading edge of said tray, wherein the downward tilting of said leading end occurs after the upward tilting of the leading and before the lateral tilting of said first half and said second half.

* * * * *